UNITED STATES PATENT OFFICE.

HOWARD R. SCOTT AND LILLIAN E. SCOTT, OF SAN JOSE, CALIFORNIA.

PROCESS OF TREATING NUT KERNELS TO PRODUCE FOOD INGREDIENTS.

1,416,128.

Specification of Letters Patent. Patented May 16, 1922.

No Drawing. Application filed July 1, 1920. Serial No. 393,381.

*To all whom it may concern:*

Be it known that we, HOWARD R. SCOTT and LILLIAN E. SCOTT, citizens of the United States, and residents of San Jose, in the county of Santa Clara and State of California, have invented certain new and useful Improvements in a Process of Treating Nut Kernels to Produce Food Ingredients, of which the following is a specification.

Our invention relates to a process of treating nut kernels to produce a food ingredient, and has reference to the treatment of prune, peach and apricot kernels and deriving therefrom a food or an ingredient of foods, which, for convenience, we will call a mealy substance that is best suited for use in confectionery foods, especially in making a so-called macaroons confection.

It is a known fact that prune, peach and apricot kernels contain amygdalin, which in the presence of water and the ferment emulsin breaks up into hydrocyanic acid, benzaldehyde and glucose. The hydrocyanic acid thus liberated renders the kernel undesirable for human consumption. It is, therefore, the primary object of our present invention to remove the bulk of the hydrocyanic acid formed during the decomposition to render the product suitable for human consumption and to reduce the content of benzaldehyde to a point where it will only impart to the meal its characteristic flavor.

In carrying out the process we prefer to proceed by first blanching the kernels by immersion in boiling water for a desired period, for instance,—two minutes,—draining the substance, and immersing the same in cold water, separating the skins and kernels and then roughly drying the kernels.

After the kernels have been dried to the desired degree, they are ground, or cut, into particles or left whole, and if desired, the fixed oil contained therein may be extracted by pressure. The extraction of this fixed oil may, or may not, be carried out, depending upon the desired composition of the finished product. After these steps, the kernels, (or reground press cake) are then extracted with water. A desirable product, free from hydrocyanic acid and having a desirable flavor derived from benzaldehyde is obtained by treating the kernels, or reground press cake, with water at a temperature preferably between about 80° F. and about 104° F. and subsequently washing with water at a temperature preferably lower than 80° F. It is of course understood that the time of treatment is determined by the size of the kernels or the particles thereof.

From the washings thus obtained the benzaldehyde and hydrocyanic acid constituents may be recovered by separate distillation.

The extracted meal should be pressed without undue loss of time as free, as possible from water, and dried at a low temperature.

The resultant dried product may be incorporated or mixed with water and with sufficient oil and sugar to form the so-called macaroon paste or may be used as an ingredient of, or basis, of other foods and confections.

The partially dried product may be incorporated or mixed with oil and sugar, if desired, to form macaroon paste.

We claim:

The herein described process for treating prune, peach and apricot kernels to realize a food ingredient, which consists in first subjecting the kernels to the presence of water to effect the decomposition of the amygdalin content by the action of the existing ferment emulsin, removing by filtration the benzaldehyde and hydrocyanic acid products which are present in the water solution, distilling the filtrate separately to recover the benzaldehyde and hydrocyanic acid products and washing the residue of wet kernel meal to remove the soluble products remaining from the first treatment.

HOWARD R. SCOTT.
LILLIAN E. SCOTT.